Dec. 15, 1925.

C. W. GIRVIN 1,565,997

CENTRIFUGAL DEHYDRATOR

Filed April 3, 1923

INVENTOR:
CHARLES W. GIRVIN,
BY
Graham + Davis
ATTORNEYS.

Patented Dec. 15, 1925.

1,565,997

UNITED STATES PATENT OFFICE.

CHARLES W. GIRVIN, OF BUENA PARK, CALIFORNIA, ASSIGNOR TO PETROLEUM RECTIFYING COMPANY OF CALIFORNIA, OF SAN FRANCISCO, CALIFORNIA, A CORPORATION OF CALIFORNIA.

CENTRIFUGAL DEHYDRATOR.

Application filed April 3, 1923. Serial No. 629,604.

*To all whom it may concern:*

Be it known that I, CHARLES W. GIRVIN, a citizen of the United States, residing at Buena Park, in the county of Los Angeles and State of California, have invented a new and useful Centrifugal Dehydrator, of which the following is a specification.

This invention relates to the oil producing industries, and relates particularly to electrical oil dehydrators which are used in removing water from emulsions.

In flowing wells and especially those which flow by heads, the presence of water in the well encourages the formation of emulsions composed of the viscous crude oil and fine particles of water, combined with whatever sand or silt is present. These globules or particles do not readily separate from the oil owing to the fact that the globules of water are so small that the action of gravitation thereupon is not sufficient to overcome the viscidity of the oil. It is found that in the presence of an electrostatic field these globules of water will coalesce to the form of drops of sufficient size to settle out by gravitation. The agglomeration of the globules of water is accomplished by passing the emulsion through an electrostatic field between two electrodes and thereby collecting the globules into drops of water which may be separated from the oil by gravitation. This separation of water drops from the oil by gravity is slow and considerable difficulty is encountered by the water drops collecting into chains and thereby shorting the electrodes and decreasing the efficiency of the apparatus.

It is an object of the invention to provide an electrical dehydrator which will coalesce the globules of water from the oil very quickly. This is accomplished by the aid of a centrifugal action, the larger water particles and water drops as agglomerated being of greater specific gravity than the oil are thrown to outer extremity of the apparatus, thereby preventing the shorting of the electrodes by water chains.

It is a still further object to provide an apparatus of this character which will separate the water and oil, and direct them therefrom through different channels.

Additional advantages of the invention and further objects thereof will be made evident hereinafter.

Referring to the drawing which is for illustrative purposes only,

Figure 1:
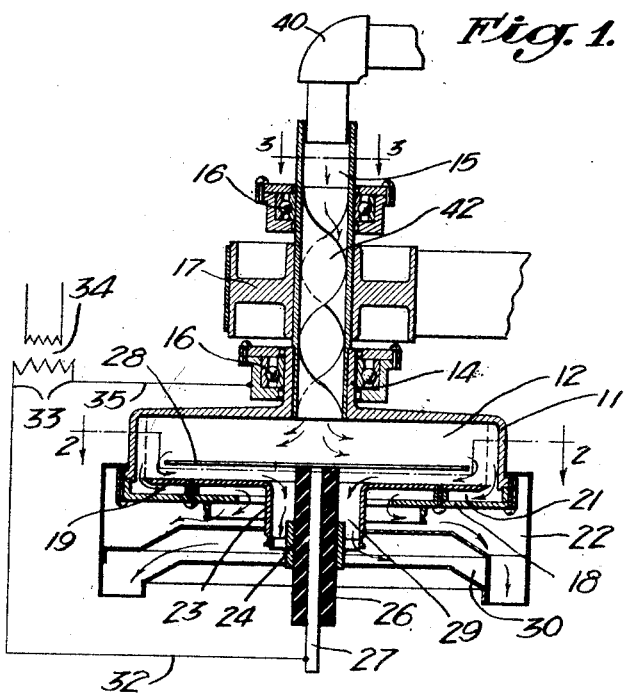
Fig. 1 is a vertical sectional view through an apparatus which embodies the features of the invention.

As shown in Fig. 1, 11 represents a shell forming a dehydrating chamber 12, which has a concentric projection 14 in which an inlet tube 15 is situated, bearings 16 being provided for rotatably supporting the extension 14 and the tube 15. A pulley 17 provides a simple means whereby the tube 15 serving as a hollow shaft and shell 11 may be belt driven from a suitable power member. Within the dehydrating chamber 12 is placed a circular partition plate 19 attached by screws 20 to the bottom plate 18 and slightly smaller in diameter than the shell 11, so as to provide a water passage 21 opening into a water receiving chamber 22. Formed integral with the partition 19 is a downwardly extending cylindrical projection 23 having a spider 24 mounted in the lower end thereof through which an insulation member 26 extends which supports a rod 27 carrying a plate 28 at its upper end. The projection 23 provides an oil outlet 29 which opens into an oil receiving chamber 30.

Connected to the rod 27 by any suitable means, such as a brush contact, is one side 32 of a high voltage circuit 33 which extends thereto from a transformer 34. The other side 35 of the high voltage circuit makes contact with the shell 11, consequently the shell 11 and the partition constitute one electrode whereas the plate 28 constitutes the other electrode, thereby creating an electrostatic field between the shell 11 and the plate 28, and between the partition 19 and the plate 28.

The emulsion to be dehydrated enters the inlet tube 15 from piping 40, and is engaged by a spiral baffle or screw 42 which assists gravitation in driving the emulsion through the centrifuge chamber 12. As hereinbefore stated, it is one of the objects of the invention to utilize centrifugal force, which will coact with the electrostatic condition, through which the emulsion passes in the chamber 12 to separate the water from the oil. This is made possible, due to the difference in specific gravity of the two liquids, the water being substantially twenty percent heavier than the oil, therefore, the water is effected more by the centrifugal force than is the oil.

Upon entering the chamber 12, the emulsion moves outwardly, as indicated by the arrows, through the electrical field created between the plate 28 and the shell 11, at which time the globules of water coalesce due to the electrostatic condition within the chamber. As soon as these globules are coalesced to the extent that they form bodies of water on which the centrifugal force is strong enough to overcome the viscous nature of the oil, they are carried to the perimeter of the chamber thereby.

Figure 3:
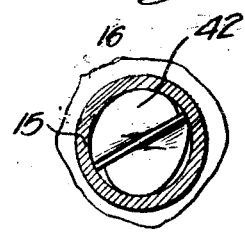
Fig. 3 is a section taken on a plane represented by the line 3—3 of Fig. 1.
Figure 2:
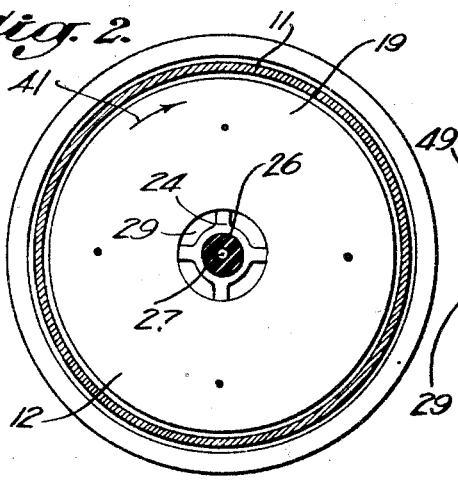
Fig. 2 is a section taken on a plane represented by the line 2—2 of Fig. 1.
Figure 4:
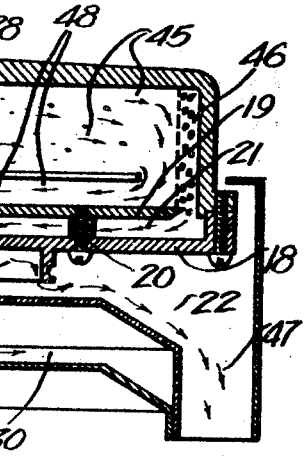
Fig. 4 is an enlarged fragmentary view showing the manner in which the water is centrifugally separated from the oil.

With especial reference to Fig. 3, the emulsion takes the course indicated by the arrows 45, during which time the particles of water are being agglomerated and thrown to the outer wall of the chamber, collecting as indicated at 46 and dropping down between the edge of the plate 28 and the side wall of the shell 11; and as more matter accumulates, the water is forced thereby through the passage 21 and into the water receiving chamber 21 as indicated by the arrows 47. By the time the emulsion reaches the periphery of the plate 28, all the water particles have been removed and it may now be considered oil. The plate 28 being of smaller diameter than the partition 19 allow the oil to drop over the edge thereof, the oil then passing as indicated by the arrows 48 through the space 49 and through the outlet 29 into the oil receiving chamber 30.

It will be recognized that the space 49 between the electrode 28 and the plate 19 is also subject to a flow of electrostatic force, but it will be further recognized that by the time the oil has reached the space 49 substantially all of the water has been removed therefrom and therefore is of high dielectric characteristics and prevents any great flow of electrostatic energy between the electrode 28 and the plate 19.

From the chamber 30, the oil may be carried to a settling tank, not shown, where such small quantities of water as may have been carried therewith may be separated therefrom; likewise, the water is also carried to a settling tank where any oil which may have been carried therewith may levitate. Downwardly extending outlets may be symmetrically disposed at the bottom of the separator, as shown.

It can be readily seen from the foregoing description that my invention makes it possible to very quickly coalesce the globulets of water in the emulsion because of the cooperation of the centrifugual forces and the electrostatic condition through which the emulsion passes. Another advantage is the elimination of shorts caused by the lining up of water drops between the electrodes, because of the fact that as soon as the drops are formed they are carried outwardly by the centrifugal force imparted thereto by rotation.

The vertical position of the electrode 28 may be adjusted by sliding the rod 27 in the insulator 26. For an emulsion containing only a small amount of water the electrode 28 may be set higher and closer to the top of the shell 11; for a very wet emulsion it may be dropped lower. The main treating action occurs in the chamber 12 above the electrode, but should any fine emulsion pass over into the space 49, it will be treated in the more intense field below the electrode.

It has been found that usually when water is emulsified in oil the water drops are so small that enormous rotational speeds are required to throw them out of the oil. But the electric field causes an agglomeration of the drops, so that several of the small ones are combined to form one large one, and these larger drops are thrown out at comparatively moderate rotational speeds. Another well known phenomenon occurring in dehydrating emulsions by means of the electrical current is that the water-drops tend to line up to form conducting paths through the oil and means must be employed to prevent this occurring. I have found that in my centrifugal dehydrator there is the same tendency to cause short-circuit, but apparently the prevention is automatically taken care of by the action of centrifugal force throwing out the large drops as soon as formed.

I claim as my invention:

1. In a dehydrator for treating an emulsion of oil and water: means for subjecting the emulsion to an electric field to coalesce particles of water; and centrifuging means for separating the oil from the water.

2. In a dehydrator: means for subjecting to an electric field material to be treated; and centrifuging means for separating constituents of said material.

3. In a dehydrator: means for subjecting to an electric field material to be treated; and centrifuging means for separating constituents of said material, separate passages being provided in the dehydrator for the passage of the separated constituents.

4. In a dehydrator for treating an emulsion of oil and water: means for subjecting the emulsion to an electric field to coalesce particles of water; and centrifuging means for separating the oil from the water, separate passages being provided in the dehydrator for the passage of the separated oil and water.

5. In a dehydrator for treating an emulsion of oil and water: means for subjecting the emulsion to an electric field to coalesce the particles of water; and centrifuging means for throwing the oil into one passage and the water into another passage.

6. In a dehydrator: means for subjecting to an electric field material to be treated; and centrifuging means for throwing a comparatively heavy constituent of said material into one passage and a lighter constituent of said material into another passage.

7. In a centrifugal electrical dehydrator, the combination of: a shell having a concentric vertical tube extending upwardly therefrom; means for rotating said shell upon its vertical axis; a bottom plate for said shell, having a concentric opening therein; a partition plate disposed slightly away from said bottom plate and within said shell, said partition plate being of slightly less extension than said bottom plate, thus providing a peripheral passage therearound, and having an annular extension projection extending downwardly through said concentric opening in said bottom plate; an electrode plate disposed in said shell parallel to said partition plate and of less extension than said partition plate and insulated from the other parts of said dehydrator; a source of electrical energy; a conductor communicating with said electrode; and a conductor for delivering electrical energy to said shell.

8. In a centrifugal electrical dehydrator, the combination of: a shell having a concentric vertical tube extending upwardly therefrom; means for rotating said shell upon its vertical axis; a bottom plate for said shell, having a concentric opening therein; a partition plate disposed slightly away from said bottom plate and within said shell, said partition plate being of slightly less extension than said bottom plate, thus providing a peripheral passage therearound, and having an annular extension projection extending downwardly through said concentric opening in said bottom plate; an electrode plate disposed in vertically adjustable relationship in said shell parallel to said partition plate and of less extension than said partition plate and insulated from the other parts of said dehydrator; a source of electrical energy; a conductor communicating with said electrode; and a conductor for delivering electrical energy to said shell.

In testimony whereof, I have hereunto set my hand at Los Angeles, California, this 27th day of March, 1923.

CHARLES W. GIRVIN.